United States Patent Office 3,700,622
Patented Oct. 24, 1972

3,700,622
PROCESS FOR PREPARATION OF RUBBER MODIFIED STYRENE-ACRYLONITRILE POLYMERS
Joseph Francis Terenzi, Ridgefield, Conn., assignor to American Cyanamid Company, Stamford, Conn.
No Drawing. Filed Dec. 21, 1970, Ser. No. 100,473
Int. Cl. C08f *15/42, 45/52*
U.S. Cl. 260—33.6 AO      5 Claims

ABSTRACT OF THE DISCLOSURE

A process for the continuous production of rubber modified styrene-acrylonitrile polymers wherein styrene and acrylonitrile are copolymerized in the presence of an inert organic solvent and in at least two stages of polymerization, the resultant copolymer is charged with a grafted polybutadiene latex to a shearing zone at a specific temperature, pressure and time so as to produce a uniform composition having both a microscopic and macroscopic dispersion of ingredients and the resultant dispersion is devolatilized and extruded under specific conditions, and compositions of said ingredients, are disclosed.

BACKGROUND OF THE INVENTION

The production of rubber modified styrene-acrylonitrile polymers is well known in the art. These so-called "ABS polymers" are useful for many applications but fail in many others because of various deficiencies. For example, most commercially available materials are contaminated to some degree due to the suspension or emulsion agents used during the manufacturing process. Furthermore, these manufacturing processes produce dark colored compositions which detract from the aesthetic appearance of articles produced therefrom. Additionally, the adhesive properties of the commercially available compositions are generally very poor and therefore prevent usage thereof in conjunction with substrates etc. U.S. Pat. Nos. 3,252,950 and 3,345,321 disclose prior compositions.

SUMMARY

I have now discovered a unique continuous process which enables independent control of the molecular weight of the styrene-acrylonitrile polymer and the particle size of the rubber. The chemistry of each phase of the system, i.e., the resin phase and the rubber phase, is thereby controlled independently. In addition, the continuous process is more economical in that the prior necessity of converting the emulsion or suspension crumb into pellets is avoided.

In regard to the product, contamination thereof from the emulsion or suspension agents is materially decreased, the color thereof is lighter than commercially available products of similar type and the adhesiveness thereof is excellent, thereby enabling the product to be laminated etc. to existing substrates and the like.

DESCRIPTION OF THE INVENTION INCLUDING PREFERRED EMBODIMENTS

According to my novel continuous process from about 60–85 parts of styrene and about 15–40 parts of acrylonitrile, the total being 100 parts, initiator and chain-length regulator are added to a solvent, boiling within the range of from about 100° C. to about 140° C. and heating the solution to a temperature of from about 90° C. to about 100° C. with continuous agitation until sufficient polymerization occurs to form thereby a solution of a certain predetermined conversion and certain predetermined percent polymer solids. The partially polymerized reaction media is then subjected to further and complete polymerization in a final polymerization zone wherein no mixing of the incoming media with the media at the bottom of the zone occurs and wherein a temperature gradient is maintained. A polymeric solution is withdrawn from said final polymerization at about 90% to 100% conversion and is subsequently treated as discussed hereinbelow.

Primarily, the first polymerization zone comprises a so-called pre-body zone wherein a solution of styrene-acrylonitrile, initiator, chain length regulator and solvent, e.g. xylene, are admixed in amounts ranging from 10% to 40%, by weight, preferably 25% to 35%, of solvent and 90% to 60%, by weight, preferably 65% to 75% of monomers.

From about .01% to 5.0%, preferably 0.1% to 3.0%, by weight, based on the weight of monomers of a polymerization initiator is present in the solution. Any known free-radical generating polymerization initiator may be employed, with such initiators as tertiary butyl perbenzoate, dicumyl peroxide, 2,5-dimethyl 2,5-di(tert.-butyl-peroxy)-n-hexane being preferred. The particular initiator employed depends substantially upon the rate of conversion which is desired and practical in the operation of the process. Generally about 5% to 10% conversion per hour is practical and satisfactory. However, it should also be noted that the half-life of the initiator should be such that rapid dissipation occurs in the last polymerization zone of the process. Generally, initiators which have half-lives of about 100 hours at the first and second polymerization zone temperatures have been found to be preferred since they are most practical.

Examples of other initiators which may also be used are benzoyl peroxide, lauroyl peroxide, azobisisobutyronitrile, 2,5-dimethyl-2,5-di(t-butylperoxy)hexane, the dialkyl peroxides, e.g. diethyl peroxide, dipropyl peroxide, dilauryl peroxide, dioleyl peroxide, distearyl peroxide, di-(tertiary-butyl)peroxide and di-(tertiary-amyl)peroxide, such peroxides often being designated as ethyl, propyl, lauryl, oleyl, stearyl, tertiary-butyl and tertiary-amyl peroxides; the alkyl hydrogen peroxides, e.g. tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl, peroxide and the like.

Other examples of organic peroxide initiators which may be employed are the following: tetralin hydroperoxide, cumene hydroperoxide, tertiary-butyl perbenzoate and the like.

A chain length regulator must also be utilized in my process in order to enable effective control of the molecular weight of the copolymer being produced. Generally, amounts ranging from about 0.2% to about 1.0%, by weight, based on the weight of monomers, are employed with the lowest amounts enabling the production of the polymers with the highest molecular weights. Examples of regulators which may be used, the selection of said regulator being governed by the temperature of reaction, i.e. the regulator must possess a boiling point above said reaction temperature, include the organic sulfur compounds, i.e. the thio acids, mercaptans, such as benzyl mercaptan, aliphatic mercaptans possessing at least 6 carbon atoms, such as octyl, n-dodecyl and t-dodecyl mercaptan, mixtures of mercaptans such as are obtained from lauryl alcohol, nitrohydroazine, etc., amino compounds, or any other well-known polymerization modifier or regulator which possesses the qualifications expressed above.

The temperature in the first polymerization zone is maintained between about 90° C. and 100° C., with 95° C. to 100 C. being preferred, for from about 3 to 10 hours, i.e. until a polymer solids content of between about 35% to 65%, by weight, preferably 45% to 55%, is attained.

During the polymerization in the first stage, the reaction media is continually agitated. That is to say, the reaction is conducted in a fully turbulent agitation state such as that defined in Badgar and Bancheros, "Introduction to Chemical Engineering," page 614, McGraw-Hill Publishers (1955). In this manner the desired degree of conversion may be effected since the agitation assists in the dissipation of the exothermic heat given off during the reaction. The agitation in the first zone must be continuously employed during the entire reaction and must be such that agitation of the reaction media can be continued at the aforesaid maximum percentages of conversion and solids content.

Although generally one reaction stage is employed in the first polymerization zone, it is permissible to use two, three, etc. or more stages, if desired, if a polymer is being produced which has such a viscosity in each stage, that a different means of agitation is necessary in order to continue effective dispersion of the viscous polymeric media during the polymerization thereof to the optimum solids content.

The inert, organic solvent employed in the process must possess a boiling point of between about 100° C. and about 140° C. Examples of solvents which may be used are the alkyl aromatic hydrocarbons, e.g. toluene, xylene, etc.; esters, such as amyl acetate; chlorinated paraffins and aromatics; ketones, e.g., 2-methyl-pentanone-4; Cellosolve and the like. Generally, any inert solvent for the charge having a boiling point within the above range may be employed with those most economically available and causing the least deleterious effect to the polymer, i.e., xylene, toluene, etc., being preferred. Higher boiling solvents are undesirable since they present numerous difficulties in regard to their subsequent removal and recovery from the product polymer. One further desired property of the solvent that is to be employed is that it be such that the viscosity of the final polymeric solution, at the temperature at the bottom of the third polymerization zone, is low enough to allow practical withdrawal of the polymeric solution from the final polymerization zone at the high solids level mentioned hereinbefore.

Upon removal of the reaction media from the first polymerization zone, it is then transferred to the final, and most important, polymerization zone of my process. It is this final polymerization zone which enables the production of polymers at more than 90% conversion, and even up to 100% conversion. The final zone consists of a vertical plug flow vessel which is partitioned off into individual, interconnected zones capable of being heated individually to a specific temperature. By "plug flow vessel" is meant a vessel wherein substantially no mixing of the incoming reaction media occurs with the reaction media at the bottom of the vessel. That is to say, there is no back flow of material, thereby causing material which is more completely polymerized to come into contact with that material which is less completely polymerized. The incoming reaction media, which is pre-polymerized in the first two polymerization zones, is allowed to flow slowly downwardly through the final polymerization zone, without coming into contact with more completely polymerized monomer, and in this manner a percent conversion of at least 90% and a solids content of at least 60% is attained.

Since substantially no agitation is conducted in the final zone, heat cannot be removed in the normal manner, i.e., through wall or coil surfaces. The zone is therefore heated at the bottom to a temperature such that the highly converted, highly viscous polymeric solution of high polymer solids content is maintained flowable. That is to say, depending upon the viscosity of the polymer solution, the percent conversion obtained and the polymer solids content, the polymer solution is heated to the temperature at the bottom of the zone which will enable the product solution to remain flowable. A temperature gradient then develops in the zone and the top of the zone is thereafter maintained at a temperature of at least about 105–110° C. while at the bottom the temperature is maintained at about 115–125° C.

Only very slight agitation is tolerable in the final polymerization zone. Generally, scraper blades to keep the walls clean and a short screw at the very bottom to aid in solution removal, is sufficient. In this manner, no breaking down of the polymer or back flow occurs and each portion of the polymerizing media is, as such, allowed to flow in an essentially unrestricted manner through the whole length of the zone to substantially complete conversion. Agitation of from about 2 to 60 revolutions per hour of a scraper or blade type stirrer generally may be employed without causing degradation or backflow, the number of revolutions used depending, of course, on the diameter of the tower used, i.e. the larger the diameter, the fewer the revolutions per hour.

By conducting the final polymerization zone at the above temperature gradient, a substantially complete conversion of monomer to polymer can be accomplished and only by the use of such a solvent at such a temperature can the completely converted highly viscous polymer be removed from the zone. The unique combination of the disclosed critical solvents and the absence of agitation combine to allow the production, removal and transfer of the high solids, viscous, polymer solution of at least 90% conversion.

The time of reaction in the tower is generally from about 3 to 20 hours, preferably 8 to 15 hours and the viscosity of the polymer which is recovered at more than 90% conversion is generally not less than 500,000 cps.

As the copolymeric material is recovered from the final polymerization stage, it is charged, along with from about 5–40 parts of rubber latex, to a shearing zone. From about 60–95 parts, by weight, of the copolymer is used, the total parts of copolymer and latex being 100.

To facilitate the description of this step of my invention, the resinous polymer components of the compositions, will be referred to as component (A) and the rubbery, elastomeric latex will be referred to as component (B).

The elastic rubbery component (B) is employed in a dispersed form, as a colloidal emulsion, such as an SBR latex, the proportion of rubbery solid in the dispersion comprising between about 30% and 60% of the emulsion.

The resinous polymer (A) may be used as recovered from the last polymerization zone but it is preferred that a solution containing not more than about 80% polymer, preferably at least 45% polymer, be prepared by the addition of more solvent. Amounts of polymer greater than 80% tend to result in difficulties in handling the material thereby minimizing the economical advantage afforded by my novel process by correspondingly prolonged the processing time required in subsequent steps.

Component (A) and component (B) are then contacted at a temperature ranging from about 50° C. to about 100° C., preferably about 70° C. to about 90° C. Temperatures below 50° C. tend to create difficulty in handling the components because the viscosity of component (A) is such that the working thereof is practically impossible at lower temperatures. Because a rubber latex is employed, the boiling point of water (100° C.) governs the maximum temperature, however, it is within the scope of the present invention to use pressures above atmospheric, i.e., up to about 5 p.s.i., preferably not over 50 p.s.i., and thereby enable the use of slightly higher temperatures. While at these pressures and temperatures, the combined components (A) and (B) are held for a period of from about one minute to about 30 minutes, preferably about 2 to 10 minutes, while they are continuously subjected to continued subdivision and recombination action effected by shearing, thereby producing a uniform composition having both a microscopic and a macroscopic dispersion of the components.

Any type of apparatus which functions so as to perform such a pretreatment on the resinous polymer solution and the rubbery latex dispersion or solution may be used in the process of the present invention. One type of apparatus which may be used is of a commercially available design and comprises a chamber which contains a single, horizontal shaft with an interrupted screw thereon, said screw possessing flights constructed so as to move the rubber latex and resinous solution being treated in a forward direction. Stationary anvils, attached to the housing, may be inserted into the interruptions of the screw. The interaction of the rotating horizontal screw and the stationary anvils gives a continuous kneading and mixing action so as to cause a continual subdivision and recombination of the rubber latex and the resin polymer solution being pretreated. Various breaker plates and die plates may be positioned in the apparatus to provide back pressure to increase the holdup time and shearing action which occurs inside the chamber. Generally, three plates may be employed, two of which are of the breaker variety and one of which is a die plate. The breaker plates are positioned internally and the die plate is generally positioned at the discharge end of the chamber. The plates contain holes ranging in size from about ⅛ inch to about ⅝ inch. Each plate may contain the same size holes or each plate may have different size holes therein. Although the above discussion indicates that three die plates may be used, it is possible to employ as many as five and as few as one plate, depending upon the holdup time desired.

Although apparatus of the type described above is preferred, it should be understood that any other type of apparatus which will cause the continuous subdivision and recombination of the rubber latex and the resinous polymer solution may be used provided that such apparatus is conducive to the use thereof in a continuous process rather than a batch process.

A coagulant is generally added to the shearing zone in order to coagulate the latex. In this manner, the latex is converted to a more processable phase and advantageously, the impact strength of the recovered compositions is enhanced thereby. Any known coagulant may be used in amounts ranging from about 0.01% to about 3.0%, by weight, based on the weight of the latex. Examples of suitable coagulants include salts such as ammonium acetate, sodium chloride, sodium bisulfite, ferrous sulfite, calcium chloride, magnesium chloride, magnesium sulfate, alum etc.; acids such as acetic acid, formic acid etc.; alcohols such as ethyl alcohol etc. and the like.

Additionally, I have found that up to about 5.0%, by weight, based on the weight of component (B), of a mineral oil may be added to the compositions in the shearing zone. I have observed that the addition of said oil also enhances the impact strength of the resultant compositions. Any mineral oil can be utilized for this purpose with a petroleum fraction having a boiling point above any temperature of the process, being exemplary, e.g. above about 140° C. and including fuel oil, cycle oil etc.

The rubbery component (B) employed in my novel process comprises polybutadiene grafted with about 55–85 parts of methyl methacrylate, from about 10–30 parts of styrene and from about 1–15 parts of acrylonitrile, the total parts being 100. These grafted polybutadiene components may be prepared according to any procedure known in the art, the specific method of production forming no part of the instant invention.

As the product is recovered from the shearing zone, it is introduced into the last zone of my novel process comprising a devolatilizer-extruder which is sectionally heated at temperatures from about 110° C. to about 225° C. and is maintained under vacuum at an absolute pressure of from about 5 mm. to 200 mm. of mercury. Upon introducing the polymerized sheared material into the devolatilizer-extruder, the increased temperature and heat supplied externally and the working of the composition by the twin screws therein causes a volatilization of the solvent and the very small amount of unreacted monomer which may be present. By this operation, the purity of the product is carried up to about 99.5% and even higher. The solvent and traces of monomer which are recovered from the devolatilizer-extruder may then be recycled to the pre-body or first zone of my process if desired. When the final product is only 90% converted, of course, more monomer recycle will be effected than if there is 100% conversion during the process.

In the devolatilizer-extruder the material is worked in a chamber under heat and vacuum so that new surfaces thereof are continuously and rapidly exposed to vacuum to remove the monomeric material and solvent before extruding the product. The term "devolatilization" as herein employed refers to the step in which the nonpolymeric material is removed from the media. The apparatus which may be used is of a commercially available design and comprises a chamber with one or more screws having a close tolerance with the wall, and with one another in a multi-screw machine, for compounding the material in its passage therethrough, and at least one vacuum chamber for removing the volatile components of the feed. The action of working the material under the close tolerance of the screws not only intimately blends the mixture, but generates substantial heat which aids in the devolatilization of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or nonvolatile modifiers, plasticizers, or colorants, may be incorporated into the composition and extruded therewith.

The vacuum sections of the devolatilizer-extruder are heated from temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the polymer solution is introduced into the devolatilizer-extruder, the increased temperature causes volatilization of the nonpolymer therefrom. At the same time, because the extruder is maintained at subatmospheric pressures, the other volatile material is withdrawn or volatilized from the polymer-containing material.

There may be added to the resultant product such ingredients as light stabilizers, heat stabilizers, anti-oxidants, lubricants, plasticizers, pigments, fillers, dyes and the like, without detracting from the unique properties of my novel compositions.

The compositions formed according to the process of the present invention may be used in the manufacture of automotive parts, such as extruded and thermoformed sheets for building and vehicle components when it is desired to adhere reinforcing resins to the underside for greater stiffness and toughness, furniture components, packaging materials, i.e., tubs, bottles, etc. and various kinds of injection molded articles.

The following examples are set forth for purposes of illustration only and are not to be construed as limitations on the instant invention except as set forth in the appended claims. All parts and percentages are by weight unless otherwise indicated.

Example 1

A mixture of 73 parts of styrene and 27 parts of acrylonitrile dissolved in 30 parts of toluene, 0.28 part of t-butyl peroxide and 0.28 part of dodecyl mercaptan is charged to a five gallon turbine-agitated reactor. The temperature is slowly increased to 95° C., at which time about one gallon/hour of the same composition is continuously charged. The reactor contents are allowed to overflow through an overflow nozzle. The temperature is held at 95° C., and after 18 hours, a steady state is achieved and the conversion reaches 50%.

The overflow from the first zone is then fed directly into the top of a plug flow zone which is about 10 gallons in volume and 8 inches in internal diameter. Top and bottom sight glasses allow visual examination of the reactor contents at the ten and five gallon level, respectively. The speed of the scraper-agitator in the tower is set at three revolutions per hour and hot oil (100° C.) is applied to the bottom section thereof. When the level reaches the top sight glass (about 10 hours) the temperature of the bottom jacket oil is gradually increased to 120° C. Hot oil (107° C.) is then applied to the stop section of the tower. Polymer solution is continuously fed into the top of this zone and withdrawn from the bottom at a rate of about one gallon/hour. The effluent from the bottom measures 69% solids, or about 98% conversion after 12 hours.

The effluent (75 parts) is continuously added to 25 parts of a polybutadiene latex in a suitable vessel. The grafted latex contains monomers of 76% methyl methacrylate, 21% styrene and 3% acrylonitrile resulting in a latex with a 3.0/1 ratio of polybutadiene to grafted monomers. Three parts of ammonium acetate are added as coagulant along with 1 part of a commercially available antioxidant. The resin solution is fed into said vessel at 135° C. and the latex is fed at 20° C. The vessel contains 2 breaker plates and a die plate having holes of ½ inch, ⅜ inch and ⅜ inch, respectively. The mixture is continuously treated at a temperature of approximately 70° C. in said vessel for approximately 2.5 minutes. The treated mixture is then fed to a twin screw devolatilizer-extruder maintained at the feed end at a temperature of 80° C., at the extrusion end at a temperature of about 200° C. and at the central portion at a temperature of about 170° C. The resultant devolatilized molding composition is continuously extruded from the devolatilizer, after a retention time of about 3 minutes, to yield a composition having an impact strength of 7.2 f.p.p.i. Izod Notched molded as a ⅛" bar. The Yellowness Index of the composition is 19, the Tensile Modulus (RT) is $2.9 \times 10^5$ and the Tensile Strength is $5.2 \times 10^3$ (RT) and $3.2 \times 10^3$ (160° F.). The impact strength at −40° F. is 2.4 f.p.p.i. The material adheres readily to a polyester substrate while commercially available material does not. The commercially available material has an Izod Notched impact strength of 7.2 f.p.p.i. but a Yellowness Index of 39, a Tensile Modulus (RT) of $2.4 \times 10^5$ and a Tensile Strength of $4.8 \times 10^3$ (RT) and $2.4 \times 10^3$ (160° F.).

Example 2

A mixture of 60 parts of styrene and 40 parts of acrylonitrile, dissolved in 30 parts of xylene, 0.09 part 2,5-dimethyl-2,5-di-(tertiary butylperoxy)hexane and .03 part of dodecyl mercaptan is charged to a five gallon turbine-agitated reactor. The same procedure is followed as in Example 1. After 25 hours, the solids level in the overflow from the first zone is 60%.

The effluent from this polymerization zone is fed into a second polymerization zone comprising a plug flow tower in a manner similar to that described in Example 1. The polymer solution continuously withdrawn from the bottom of the plug flow reactor measures 68.5% solids or a conversion of 98%. 60 parts of the resultant copolymer are added to a suitable mixing vessel along with 40 parts of a polybutadiene rubber latex, and coagulant and antioxidant as in Example 1. The grafted latex contains monomers of 55% methyl methacrylate, 30% styrene and 15% acrylonitrile resulting in a latex with a 3.0/1 ratio of polybutadiene to grafted monomers. Treatment of this mixture is continuously effected at a temperature of approximately 70° C. in said vessel which contains 2 breaker plates and one die plate having holes therein of ⅜ inch, ⅜ inch, and ¼ inch, respectively. The holdup time in said vessel is approximately 12 minutes. Upon subjection of this treated mixture to a twin screw devolatilizer-extruder under conditions set forth in Example 1, a molding composition yielding articles having an impact strength of 7.6 f.p.p.i. Izod (Notched) is recovered. This operation is conducted in the continuous fashion described above for about four days during which time over 1200 pounds of product is obtained. A typical commercially available ABS resin of comparable impact strength is inferior in color and mechanical properties to the instant composition.

Example 3

A mixture of 85 parts of styrene and 15 parts of acrylonitrile dissolved in 30 parts of toluene, 0.09 part of 2,5-dimethyl-2,5-di-tertiary butylperoxy hexane and 0.245 part of dodecyl mercaptan is charged to the pre-body and tower reactors as in Example 1. 0.70 part of stearyl alcohol and 0.35 part of methyl salicylate are also added as flow promoter and ultraviolet light absorber. Dodecyl mercaptan addition is lowered to 0.35 part later during the operation in order to adjust the molecular weight of the polymer.

The run is conducted in a manner similar to that described in Example 1. The conversions at the steady state were 62% and 96%, in the first and bottom of the second polymerization zones, respectively. The temperature in the first zone was 100° C. In the plug flow zone, temperatures were 109° C. at the top and 125° C. at the bottom. The product has a molecular weight of about 130,000 at the beginning of the run and 100,000 after the mercaptan adjustment as determined from correlation with intrinsic viscosity, over the course of the run. Total residuals are less than 1.0%. 95 parts of the copolymer are added to 5 parts of a grafted polybutadiene latex. The grafted latex contains monomers of 85% methyl methacrylate, 14% styrene and 1% acrylonitrile resulting in a latex with a 2.0/1 ratio of polybutadiene to grafted monomers. The blend is then treated according to Example 1 in a vessel for approximately three minutes. After devolatilization the molding composition recovered is molded into a pale yellow bar having an impact strength of 4.8 f.p.p.i. Izod (Notched). A commercially available ABS polymer composition of identical impact strength is dark brown and poorer in mechanical strength and adhesive ability.

Example 4

A mixture of 70 parts of styrene and 30 parts of acrylonitrile, dissolved in 30 parts of xylene, are charged to a five gallon turbine-agitated reactor along with 0.09 part of 2,5-dimethyl-2,5-di-tertiary butylperoxy hexane and 0.14 part of dodecyl mercaptan. The temperature is slowly increased to 98° C. and about one gallon of the same feed is then fed to the reactor per hour. The reactor contents are then allowed to overflow through an overflow valve. The temperature is held at 98° C. and after about 15 hours a steady state is achieved and the overflow reaches 52% conversion.

The overflow is then transferred to a second polymerization zone comprising a plug flow tower (as described in Example 1). The stirrer speed is set to 2 r.p.h. and the bottom section of the tower is heated to 120° C., with a hot oil. After about 6 hours, hot oil is applied to the top of the tower, thereby heating said top section to 108° C. Polymer solution from the first polymerization zone is continually fed to the tower at the rate of one gallon per hour. A slight ammonia flow is added to the vapor space at the top of the tower in order to prevent vapor phase polymerization of any monomeric acrylonitrile. The polymer product withdrawn from the bottom of the tower at the end of 12 hours has a solids content of 68% solids or about 98.5% conversions.

75 parts of the resultant copolymer are then added to a suitable mixing vessel along with 25 parts of the grafted polybutadiene latex of Example 1. Coagulant and antioxidant are added as in said Example 1 along with 5 parts of a mineral oil fraction boiling at about 140° C. The resultant mixture is then treated according to the procedure set forth in Example 1 at 90° C. with a vessel having holes of ¼ inch, ¼ inch and ¼ inch on the breaker plates and die plates, respectively for 6 minutes. Upon devolatilization, a molding composition having an impact strength of 8.4 f.p.p.i. Izod (Notched) as ⅛" bars is recovered. The bars are light in color and have excellent mechanical properties and adhesion. At −40° F. the impact strength is 4.5 f.p.p.i.

I claim:

1. A process which comprises (1) continually charging to a first polymerization zone a solution of about 60–85 parts of styrene and about 15–40 parts of acrylonitrile, at a temperature of from about 90° C. to about 100° C. and with continuous agitation, along with (a) a solvent for said styrene and acrylonitrile, said solvent having a boiling point of from about 100° C. to about 140° C., (b) a free-radical polymerization initiator and (c) a chain length regulator, said solution containing from about 10% to about 40%, by weight, of said solvent, from about .01% to about 5.0%, by weight, of said initiator and from about 0.2% to about 1.0%, by weight, of said chain length regulator, each based on the total weight of said styrene and acrylonitrile, (2) continuing the polymerization until the conversion of the monomers in said first zone reaches from about 35%–65%, (3) transferring the resultant reaction media to a second polymerization zone wherein a temperature gradient of from about 105° C.–110° C. at the top of said second zone to about 115° C.–125° C. at the bottom of said second zone is maintained, (4) allowing said reaction media to flow slowly downwardly through said second zone in the substantial absence of externally applied agitation until the percent conversion of said styrene and acrylonitrile is at least about 90%, (5) charging (A) from about 60–95 parts of the resultant reaction media to a third zone along with (B) about 5–40 parts of a latex of from about 200–300 parts of polybutadiene grafted with about 55–85 parts of methyl methacrylate, about 10–30 parts of styrene and about 1–15 parts of acrylonitrile, (C) up to about 5% of oil and (D) a coagulant, (6) holding the resultant mixture at a temperature of between about 50° C. and about 100° C. and a pressure of less than about 50 p.s.i. for a period of about 1–30 minutes while continuously subjecting said mixture to a continual subdivision and recombination effected by shearing so as to produce a uniform composition having both a microscopic and macroscopic dispersion of said (A) and (B), (7) continuously removing the resultant dispersion to a fourth zone heated to a temperature of from about 110° C. to about 245° C. and under vacuum to thereby remove substantially all of the volatile ingredients in said dispersion and (8) recovering the resultant molding composition so produced.

2. A process according to claim 1 wherein said solvent is toluene.

3. A process according to claim 1 wherein the polymerization in said first zone is conducted for from about 10–25 hours.

4. A process according to claim 1 wherein the polymerization in said second zone is conducted for from about 5–15 hours.

5. A process according to claim 1 wherein antioxidants and pigments are added to the charge to said third zone.

References Cited

UNITED STATES PATENTS

| | | | |
|---|---|---|---|
| 3,542,904 | 11/1970 | Weitzel et al. | 260—876 R |
| 3,450,794 | 6/1969 | Ebneth et al. | 260—876 R |
| 3,591,657 | 7/1971 | Ide et al. | 260—876 R |
| 3,524,536 | 8/1970 | Terenzi et al. | 260—876 R |
| 3,354,238 | 11/1967 | Schmitt et al. | 260—876 R |
| 3,287,443 | 11/1966 | Saito et al. | 260—876 R |
| 3,515,692 | 6/1970 | Carrock et al. | 260—33.6 U |
| 3,555,119 | 1/1971 | Ingulli et al. | 260—876 R |

MORRIS LIEBMAN, Primary Examiner

S. L. FOX, Assistant Examiner

U.S. Cl. X.R.

260—34.2, 876 R